W. A. SISSON.
Wheel Cultivator.

No. 68,124.

Patented Aug. 27, 1867.

Witnesses:
Chas H Poole
D. B. Ventre

Inventor:
W. A. Sisson
By his Atty
R. D. O. Smith

United States Patent Office

W. A. SISSON, OF SHEFFIELD, ILLINOIS.

Letters Patent No. 68,124, dated August 27, 1867.

IMPROVEMENT IN WHEEL CULTIVATORS.

The Schedule referred to in these Letters Patent and making part of the same.

TO ALL WHOM IT MAY CONCERN:

Be it known that I, W. A. SISSON, of Sheffield, in the county of Bureau, and State of Illinois, have invented a new and useful Improvement in Wheel Cultivators; and I do hereby declare the following to be a full, clear, and exact description of the same, reference being had to the accompanying drawings, in which—

Figure 1:
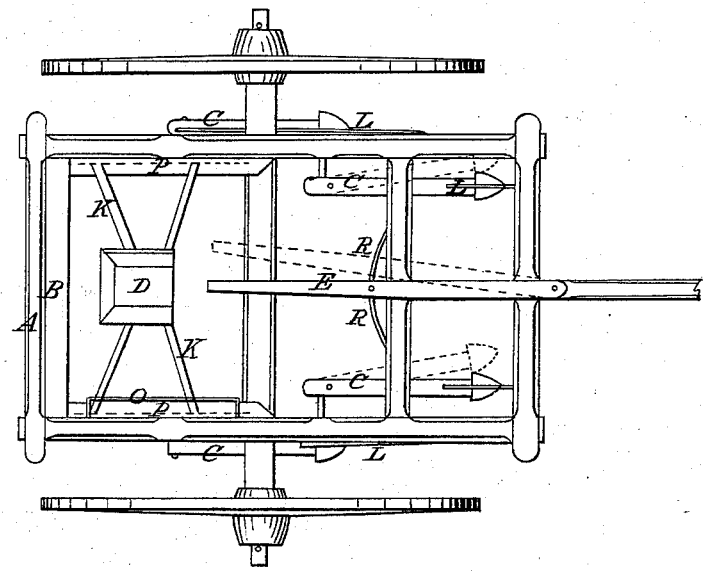

Figure 1 represents a plan of my cultivator, and

Figure 2:
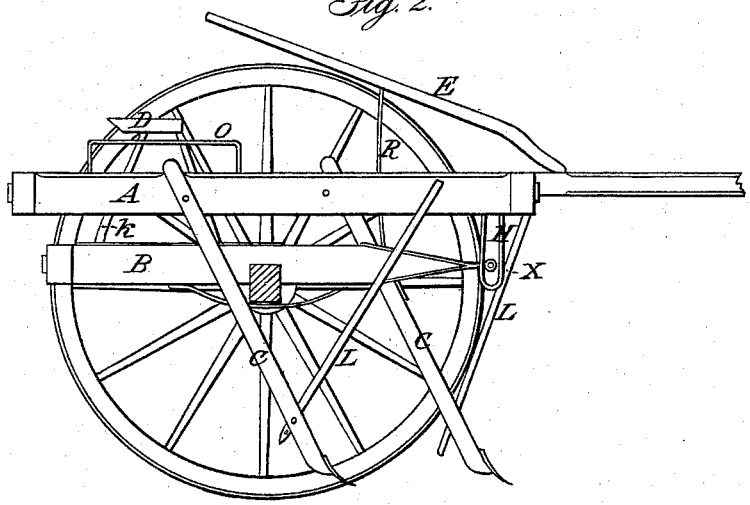

Figure 2 a side elevation of the same.

My invention consists in an improved form of cultivator, in which the shovel-frame receives the draught direct from the moving power, and is independent of the carriage-frame, and is thereby better fitted for passing over any inequalities of the ground without disturbing the operation of the shovels.

In order that others may understand the construction and operation of my machine, I will proceed to particularly describe it.

The carriage-frame B, fig. 2, is made of wood, and securely attached to the axle. To the tops of the side pieces of this frame, and in rear of the axle, are fastened plates P of iron or other metal, in which are holes of suitable size and distance apart to receive the legs or supports $k$ $k$ of the driver's seat D, and permit it to be shifted backwards and forwards, at the pleasure of the driver, in order thereby to better balance the whole machine. The forward ends of the side pieces are provided with friction-rollers $x$ $x$, which are enclosed within the loops H, and permit the forward end of the carriage-frame to rise or fall without material friction.

The frame A, to which the shovels are attached, is made of wood, and is longer than the carriage-frame, but of the same width. The rear shovel-bars C C are secured to the outer side of the shovel-frame by bolts passing through both, and are supported by the braces L L. To the lower ends of these bars the shovels, of any suitable size or shape, are attached in the ordinary manner. The forward and inner shovel-bars C' C' are secured to the ends of studs projecting from the inner surface of the frame, and project forward and downward at the same angle with the rear ones, in relation to the main frame. These bars are capable of being raised or lowered, so that the shovels may cut a deep or shallow furrow by means of the braces L L, the bars having slots cut in them to admit the braces, which are secured by pins passing through both.

The forward bars are also capable of a lateral motion, which is given to them and controlled by the lever E, in connection with the connecting-rods or braces R R, the shovels moving in a direction to correspond with that of the lever E. The shovel-frame is connected with the lower frame, at the forward ends of each, by means of loops H H of iron or other metal, passing downward through a guide in the ends of the lower frame and around the rollers $x$ $x$, as is shown plainly at fig. 2, thereby allowing it to rise or fall as it is drawn forward, and conform to any inequalities of ground without regard to the wheels of the lower frame.

The tongue or shaft is attached directly to the shovel-frame, instead of the lower frame, so that it is free to move up or down, as it may be adjusted to run at any desired depth. The weight of the wheels or of the driver will make no difference with its operation, as it cannot rest on the ground with any more than its own weight. Handles O O are attached to the sides of the upper frame, in reach of the driver, by means of which the frame may be raised up, to avoid any obstruction, and while in transportation the shovels may be elevated upon the braces L L, so as to be clear of the ground.

The main advantage of this invention consists in the ready adjustment of the shovels to any desired depth, and the certainty that they will run at that depth, no matter what may be the position or weight of the wheels, there being but little weight to the upper frame; and while the draught has a tendency to carry it deeper into the ground, the lower frame effectually prevents it, by taking the weight and a portion of the strain upon itself; while, when the wheels sink into the ground from their own weight, or that of the driver, or rise and fall with the undulations of the ground, the shovels will be easily kept up, and thus the surface of the soil will be evenly and effectually cultivated.

Having thus described my invention, what I claim as new, and desire to secure by Letters Patent of the United States, is—

1. A wheel cultivator, constructed so that the draught power shall be applied direct to the shovel-frame, and the driver's seat mounted upon the carriage-frame, which is attached to the shovel-frame, at its forward end, by a loose connection, which permits said carriage-frame to rise and fall with the undulations of the ground, in any direction, without affecting the operation of the shovel-frame.

2. The friction-rollers $x\ x$ at the forward ends of the carriage-frame, in combination with the loops H H, substantially as and for the purpose set forth.

3. The perforated plates P P, in combination with the legs $k\ k$ of the driver's seat, fitted so as to be inserted into said perforations, for the purpose of adjustment, as set forth.

4. The handles O O at the sides of the shovel-frame, to enable the driver to raise said frame and free the shovels from the ground.

W. A. SISSON.

Witnesses:
 W. W. CRANDELL,
 AZARIAH SISSON.